(12) United States Patent
Xing et al.

(10) Patent No.: US 11,546,977 B2
(45) Date of Patent: Jan. 3, 2023

(54) DRIVER FOR LED AND LED SYSTEM

(71) Applicant: CONSUMER LIGHTING (U.S.), LLC, Norwalk, CT (US)

(72) Inventors: Dong Xing, Shanghai (CN); Fanbin Wang, Shanghai (CN); Xin Zhou, Shanghai (CN); Can Feng, Shanghai (CN); Langyu Xie, Shanghai (CN)

(73) Assignee: SAVANT TECHNOLOGIES LLC, Norwalk, CT (US)

( * ) Notice: Subject to any disclaimer, the term of this patent is extended or adjusted under 35 U.S.C. 154(b) by 65 days.

(21) Appl. No.: 17/045,305

(22) PCT Filed: Apr. 3, 2019

(86) PCT No.: PCT/CN2019/081203
§ 371 (c)(1),
(2) Date: Oct. 5, 2020

(87) PCT Pub. No.: WO2019/192507
PCT Pub. Date: Oct. 10, 2019

(65) Prior Publication Data
US 2021/0153321 A1    May 20, 2021

(30) Foreign Application Priority Data
Apr. 4, 2018 (CN) .......... 201810300160.6

(51) Int. Cl.
*H05B 45/37* (2020.01)
*H05B 45/00* (2022.01)
*H05B 45/385* (2020.01)

(52) U.S. Cl.
CPC .......... *H05B 45/00* (2020.01); *H05B 45/385* (2020.01)

(58) Field of Classification Search
CPC ........ H05B 45/00; H05B 45/30; H05B 45/37; H05B 45/385; H05B 47/10
See application file for complete search history.

(56) References Cited

U.S. PATENT DOCUMENTS

| 9,894,722 B2 | 2/2018 | Quan | |
| 2005/0024895 A1* | 2/2005 | Mabanta | H02M 3/3385 363/18 |

(Continued)

FOREIGN PATENT DOCUMENTS

| CN | 103220838 A | 7/2013 |
| CN | 104582058 A | 4/2015 |

(Continued)

OTHER PUBLICATIONS

International Search Report from International Appl. No. PCT/CN2019/081203, 2 pages, dated Jun. 12, 2019.

(Continued)

*Primary Examiner* — Jimmy T Vu
(74) *Attorney, Agent, or Firm* — Wood IP LLC

(57) ABSTRACT

A driver for a Light Emitting Diode (LED) comprises a main circuit of a Ringing Choke Converter (RCC), a driving circuit of the RCC, and a first adjustment module. The main circuit of the RCC comprises: an energy input terminal, an energy output terminal, and a control terminal. The energy input terminal is configured to receive an input voltage. The energy output terminal is coupled to the LED and configured to provide an output current to the LED. The control terminal is configured to receive a driving signal. The driving circuit comprises a driving signal output terminal coupled to the control terminal, and is configured to provide the driving signal to the main circuit via the driving signal output terminal. The first adjustment module is coupled between the energy input terminal and the driving signal (Continued)

output terminal, and is configured to adjust the driving signal according to the input voltage.

20 Claims, 2 Drawing Sheets

(56) References Cited

U.S. PATENT DOCUMENTS

| | | | | |
|---|---|---|---|---|
| 2014/0233269 A1* | 8/2014 | Feng | ................... | H05B 45/385 |
| | | | | 363/21.12 |
| 2014/0265935 A1* | 9/2014 | Sadwick | ................ | H05B 45/18 |
| | | | | 315/307 |
| 2016/0020691 A1* | 1/2016 | Yoon | ................... | H02M 1/4258 |
| | | | | 323/284 |
| 2016/0021711 A1* | 1/2016 | Chen | ................. | H05B 45/3575 |
| | | | | 315/206 |
| 2016/0198538 A1 | 7/2016 | Moon | | |
| 2017/0215241 A1 | 7/2017 | Long | | |
| 2018/0177009 A1* | 6/2018 | Zhang | ............... | H02M 3/33507 |
| 2019/0313492 A1* | 10/2019 | Ding | ..................... | H05B 45/37 |

FOREIGN PATENT DOCUMENTS

| | | |
|---|---|---|
| CN | 105706532 A | 6/2016 |
| CN | 106416428 A | 2/2017 |
| WO | 2019/192507 A1 | 10/2019 |

OTHER PUBLICATIONS

First Office Action for Chinese Patent Appl. No. 201810300160.6, filed Apr. 4, 2018, 9 pages, dated Apr. 17, 2020.
First Search Report for Chinese Patent Appl. No. 201810300160.6, filed Apr. 4, 2018, 1 page, dated Apr. 11, 2020.

* cited by examiner

DRIVER FOR LED AND LED SYSTEM

TECHNICAL FIELD

Embodiments of the invention relate to a driver for a Light Emitting Diode (LED) and an LED system.

BACKGROUND

A Ringing Choke Converter (RCC) is called a self-oscillating flyback converter. Because of its simple circuit structure and high energy conversion efficiency, the RCC has been widely used in a driver of a LED.

However, there is a problem in the existing LED driver composed of a RCC that an output current fluctuates greatly, and thus it is difficult to meet the requirement of LEDs for constant current output.

Therefore, it is necessary to provide a new LED driver and a new LED system to solve the above problems.

SUMMARY

A driver for an LED comprises a main circuit of an RCC, a driving circuit of the RCC, and a first adjustment module. The main circuit of the RCC comprises: an energy input terminal, an energy output terminal, and a control terminal. The energy input terminal is configured to receive an input voltage. The energy output terminal is coupled to the LED and configured to provide an output current to the LED. The control terminal is configured to receive a driving signal. The driving circuit comprises a driving signal output terminal coupled to the control terminal, and is configured to provide the driving signal to the main circuit via the driving signal output terminal. The first adjustment module is coupled between the energy input terminal and the driving signal output terminal, and is configured to adjust the driving signal according to the input voltage.

An LED system comprises an LED, a main circuit of an RCC, a driving circuit of the RCC, and a first adjustment module. The main circuit of the RCC comprises: an energy input terminal, an energy output terminal, and a control terminal. The energy input terminal is configured to receive an input voltage. The energy output terminal is coupled to the LED and configured to provide an output current to the LED. The control terminal is configured to receive a driving signal. The driving circuit comprises a driving signal output terminal coupled to the control terminal, and is configured to provide the driving signal to the main circuit via the driving signal output terminal. The first adjustment module is coupled between the energy input terminal and the driving signal output terminal, and is configured to adjust the driving signal according to the input voltage.

BRIEF DESCRIPTION OF THE DRAWINGS

These and other features, aspects and advantages of the invention will become better understood when reading the following detailed description with reference to the accompanying drawings. In the accompanying drawings, the same element numbers are used to denote the same components throughout the accompanying drawings, in which.

DETAILED DESCRIPTION OF THE EMBODIMENTS

In order to help those skilled in the art to accurately understand the subject matter claimed by the invention, particular embodiments of the invention will be described in detail below with reference to the accompanying drawings. In the following detailed description of these particular embodiments, the specification does not describe some well-known functions or structures in detail, so as to avoid unnecessary details from affecting the disclosure of the invention.

Unless otherwise defined, the technical terms or scientific terms used in the claims and the specification shall be the common meanings understood by those with ordinary skills in the art to which the invention belongs. The words "first", "second" and similar words used in the specification and the claims are not intended to indicate any order, quantity or importance, but only to distinguish different components. The words "one" or "a/an" and the like do not indicate a quantity limitation, but mean the presence of at least one. "Including" or "having" and other similar words mean that the elements or objects existing before "including" or "having" encompass the elements or objects and their equivalent elements listed after "including" or "having", and do not exclude other elements or objects. "Connecting" or "connected" and other similar words are not limited to physical or mechanical connection, and may include electrical connection, whether direct or indirect.

An embodiment of the invention relates to an LED driver, and an LED system comprising the LED driver.

Figure 1:
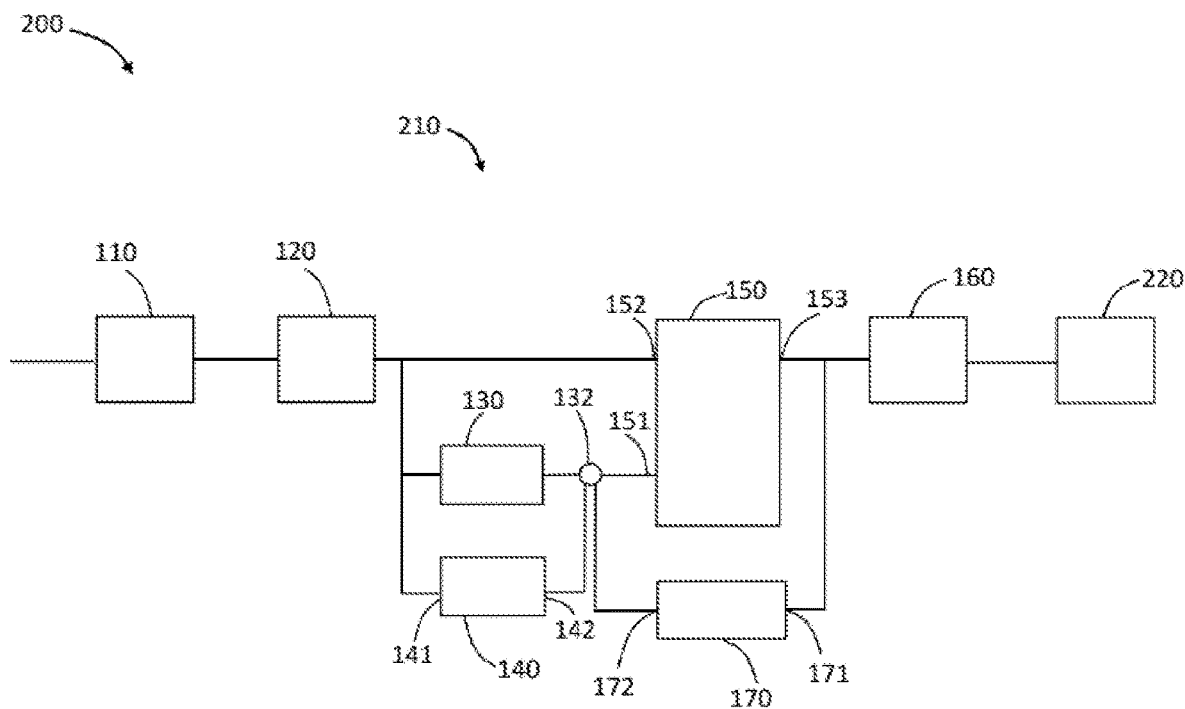
FIG. 1 is a schematic diagram of an LED system according to a particular embodiment of the invention.

FIG. 1 is a schematic diagram of an LED system 200 according to a particular embodiment of the invention. Referring to FIG. 1, the LED system 200 comprises an LED driver 210 and an LED 220. The LED 220 is coupled to an output terminal of the LED driver 210.

As shown in FIG. 1, the LED driver 210 comprises an RCC and a first adjustment module 140. The RCC is configured to receive an input AC voltage and output a substantially constant output current to the LED 220. The first adjustment module 140 is configured to compensate the output current, thereby reducing ripples in the output current and improving the line voltage adjustment performance.

The RCC comprises a main circuit 150 and a driving circuit 130. The main circuit 150 converts received energy under the control of the driving circuit 130 and outputs it to the LED 220. Particularly, the main circuit 150 comprises an energy input terminal 152, an energy output terminal 153, and a control terminal 151. The energy input terminal 151 is configured to receive an input voltage. The energy output terminal 153 is coupled to the LED 220 and configured to provide an output current to the LED 220. The control terminal 151 is configured to receive a driving signal from the driving circuit 130. Accordingly, the driving circuit 130 comprises a driving signal output terminal 132 coupled to the control terminal 151 of the main circuit 150. The driving circuit 130 is configured to provide a driving signal to the main circuit 150 via the driving signal output terminal 132.

The first adjustment module 140 is coupled between the energy input terminal 152 of the main circuit 150 and the driving signal output terminal 132 of the driving circuit 130, and is configured to adjust the driving signal output by the driving circuit 130 according to the input voltage of the main circuit 150.

In some embodiments, the driving signal comprises a driving current, and the first adjustment module 140 is configured to adjust the driving current by absorbing a part of the driving current (that is, a first part of the driving current). The adjusted driving current is equal to an original output current output by the driving circuit minus the absorbed first part of the driving current. The first adjustment module 140 adjusts the magnitude of the driving current finally output to the main circuit 150 by adjusting the magnitude of the absorbed first part of the driving current.

In some embodiments, as shown in FIG. 1, the LED driver 210 further comprises a second adjustment module 170, which is coupled between the energy input terminal 153 of the main circuit 150 and the driving signal output terminal 132 of the driving circuit 130 and is configured to adjust the driving signal output by the driving circuit 130 according to the output current of the main circuit 150.

In some embodiments, the driving signal comprises a driving current, and the second adjustment module 170 is configured to adjust the driving current by absorbing a part of the driving current (that is, a second part of the driving current). The second adjustment module 140 adjusts the magnitude of the driving current finally output to the main circuit 150 by adjusting the magnitude of the absorbed second part of the driving current. The adjusted driving current is equal to the original output current output by the driving circuit minus the sum of the first part of the driving current and the second part of the driving current absorbed by the first and second adjustment modules.

In some embodiments, the LED driver 210 further comprises a rectifier 110, a shielding module 120, and a filter 160. The rectifier 110 is coupled to the energy input terminal 152 of the main circuit 150 and is configured to convert an AC voltage from a power source (not shown) to an input voltage provided to the main circuit 150. The shielding module 120 is coupled between the rectifier 110 and the main circuit 150 and is configured to reduce or eliminate electromagnetic interference of the LED driver to the outside, such as a power grid side. The filter 160 is coupled between the main circuit 150 and the LED 220 and is configured to further reduce or eliminate ripples in the output current.

Figure 2:
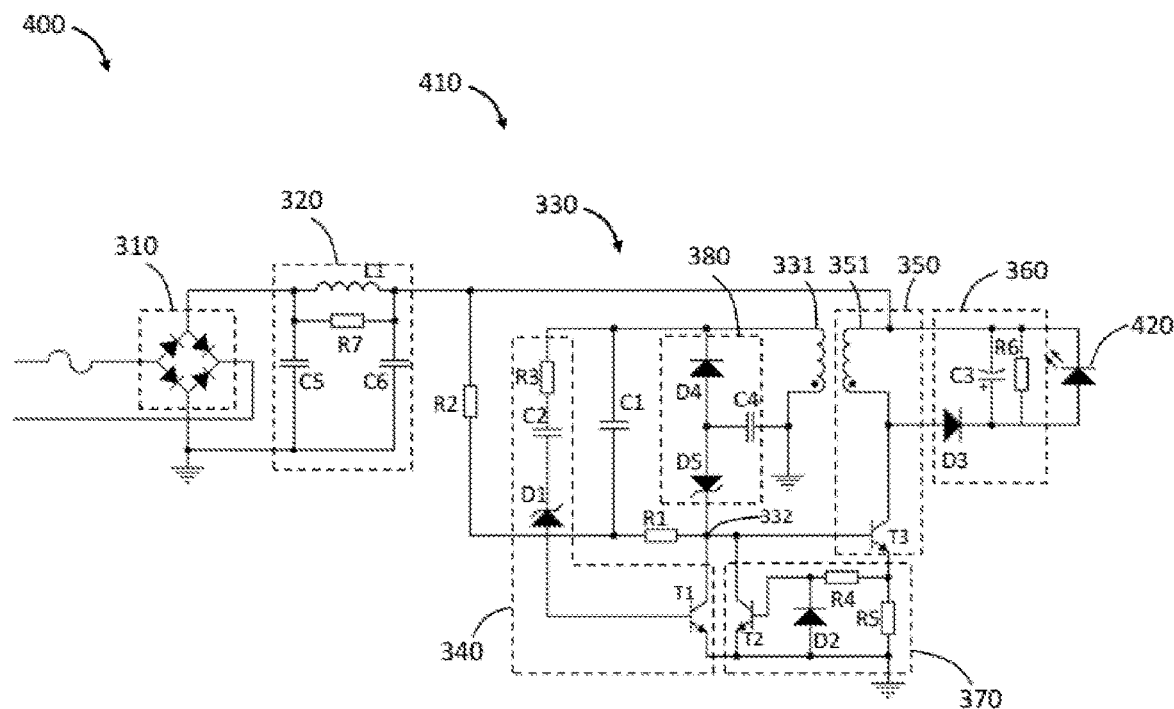
FIG. 2 is a schematic diagram of an LED system according to another particular embodiment of the invention.

FIG. 2 is a schematic diagram of an LED system 400 according to another particular embodiment of the invention. Referring to FIG. 2, the LED system 400 comprises an LED driver 410 and an LED 420. The LED driver 410 comprises a rectifier 310, a shielding module 320, a main circuit 350 of an RCC, a driving circuit 330 of the RCC, a first adjustment module 340, a second adjustment module 370, and a filter 360.

The rectifier 310 comprises four diodes for rectifying an AC voltage from a power source and converting the AC voltage to an input voltage provided to the main circuit 350. In some embodiments, the input voltage is a DC voltage.

The shielding module 320 is coupled between the rectifier 310 and the main circuit 350 and is configured to reduce or eliminate electromagnetic interference of the LED driver 410 to the outside. In the embodiment shown in FIG. 2, the shielding module 320 comprises a first inductor L1, a seventh resistor R7, a fifth capacitor C5, and a sixth capacitor C6. The first inductor L1 and the seventh resistor R7 are coupled in parallel between the rectifier 310 and the main circuit 350, the fifth capacitor C5 is coupled between a first terminal of the seventh resistor R7 and a ground terminal, and the sixth capacitor C6 is coupled between a second terminal of the resistor R7 and the ground terminal.

In the embodiment shown in FIG. 2, the main circuit 350 comprises a first coil 351 and a third triode T3. A first terminal of the first coil 351 is coupled to the shielding module 320, and a second terminal of the first coil 351 is coupled to a collector of the third triode T3. The first terminal of the first coil 351 is used as an energy input terminal of the main circuit 350 for receiving an input voltage from the rectifier 310, and a base of the third triode T3 is used as a control terminal of the main circuit 350 for receiving a driving signal from the driving circuit 330.

The driving circuit 330 comprises a driving signal output terminal 332, coupled to the base of the third triode T3 and configured to output a driving signal to the main circuit 350. The driving circuit 330 comprises a second coil 331, a first resistor R1, a second resistor R2, and a first capacitor C1. As shown in FIG. 2, the second coil 331 is magnetically coupled to the first coil 351 for inducing changes in the input voltage. A first terminal of the first capacitor C1 is coupled to a first terminal of the second coil 331, and a second terminal of the first capacitor C1 is coupled to the driving signal output terminal 332 via the first resistor R1. The second resistor R2 is coupled between the first terminal of the first coil 351 and a second terminal of the first capacitor C1.

The first adjustment module 340 is coupled between the energy input terminal of the main circuit 350 and the driving signal output terminal 332, and is configured to adjust the driving signal according to the input voltage. Further, the first adjustment module 340 is coupled between the second coil 331 of the driving circuit 330 and the driving signal output terminal 332. The first adjustment module 340 comprises a third resistor R3, a second capacitor C2, and a first triode T1. The third resistor R3 and the second capacitor C2 are coupled in series between the second coil 331 and a base of the first triode T1. A collector of the first triode T1 is coupled to the driving signal output terminal 332, and the first adjustment module 340 absorbs the first part of the driving current via the first triode T1.

In some embodiments, the first adjustment module 340 further comprises a first zener diode D1 which is, together with the third resistor R3 and the second capacitor C2, coupled in series between the second coil 331 and a base of a second triode T2. Adding the diode to the first adjustment module can further improve the compensation effect of the first adjustment module, thereby increasing the overall efficiency of the LED system.

The second adjustment module 370 is coupled between an emitter of the third triode T3 of the main circuit 350 and the driving signal output terminal 332 of the driving circuit 330. The second adjustment module comprises a second triode T2, a second diode D2, a fourth resistor R4, and a fifth resistor R5. First terminals of the fourth and fifth resistors R4 and R5 are both coupled to the emitter of the third triode T3, an anode of the second diode D2 is coupled to a second terminal of the fifth resistor R5, a cathode of the second diode D2 is coupled to a second terminal of the fourth resistor R4, a base of the second triode T2 is coupled to the cathode of the second diode D2, an emitter of the second triode T2 is coupled to the anode of the second diode D2, and a collector of the second triode T2 is coupled to the driving signal output terminal 332.

In some embodiments, the driving signal output by the RCC driving circuit 330 comprises a driving current, and the driving current is divided into three parts at the driving signal output terminal 332. A first part of the driving current flows from the collector to the emitter of the first triode T1, and is absorbed by the first adjustment module 340. A second part of the driving current flows from the collector to the emitter of the second triode T2, and is absorbed by the second adjustment module 370. A third part of the driving current flows into the control terminal of the main circuit 350, that is, the base of the third triode T3, for driving and controlling the main circuit 350.

The adjustment process of the first adjustment module 340 is substantially as follows. When the input voltage received by the first coil 351 of the main circuit 350 is increased, the voltage across the second coil 331 is also increased, so that the base current of the first triode T1 of the first adjustment module 340 is increased. The increase in the base current of the first triode T1 will make a stronger conduction ability between its collector and emitter, so that the first part of the driving current absorbed by the first triode T1 from the driving signal output terminal 332 is increased, the third part of the driving current flowing into the base of the third triode T3 is reduced, the conduction ability is weakened, and finally, the increase of the output current will be suppressed.

Conversely, when the input voltage received by the first coil 351 is reduced, the voltage across the second coil 331 is also reduced, so that the base current of the first triode T1 of the first adjustment module is reduced, the conduction ability between the collector and emitter of the first triode T1 is weakened, and the first part of the driving current flowing into the first triode T1 is reduced. Therefore, the third part of the driving current flowing into the base of the third triode T3 will be increased, the conduction ability will be strengthened, and finally, the reduction of the output current will be suppressed.

The adjustment process of the second adjustment module is substantially as follows. When the emitter current of the third triode T3 is increased, the voltage across the fifth resistor R5 is also increased, so that the voltage between the base and emitter of the second triode T2 is increased, and the conduction ability of the second triode T2 is strengthened. Therefore, the second part of the driving current absorbed by the second triode T2 from the driving signal output terminal 332 is increased, the third part of the driving current flowing into the base of the third triode T3 is reduced, the conduction ability is weakened, and finally, the increase of the output current is suppressed.

Conversely, when the emitter current of the first triode T1 is reduced, the voltage across the fifth resistor R5 is also reduced, so that the voltage between the base and emitter of the second triode T2 is increased, and the conduction ability of the second triode T2 is weakened. Therefore, the second part of the driving current absorbed by the second triode T2 from the driving signal output terminal 332 is reduced, the third part of the driving current flowing into the base of the third triode T3 is increased, the conduction ability is strengthened, and finally, the reduction of the output current is suppressed.

In the embodiments of the invention, by adding the first adjustment module in the LED driver, the change in the output current caused by the change in the input AC voltage can be effectively suppressed, and thus the ripples in the output current can be reduced.

Continuing to refer to FIG. 2, the filter 360 is coupled between the main circuit 350 and the LED 420, and is configured to further filter the output current output by the main circuit 350 to reduce or eliminate the ripples therein. In the embodiment shown in FIG. 2, the filter 360 comprises a third capacitor C3, a sixth resistor R6, and a third diode D3. An anode of the third diode D3 is coupled to the second terminal of the first coil 351, and the third capacitor C3 and the sixth resistor R6 are coupled in parallel between a cathode of the third diode D3 and the first terminal of the first coil 351.

The third capacitor C3 comprises an electrolytic capacitor, which mainly plays a role of filtering. As the capacity of the electrolytic capacitor is larger, the effect of reducing or eliminating ripples is better, but its volume and cost will be increased accordingly. In the technical solution disclosed in the invention, as the first adjustment module is used to compensate and suppress the change in the output current, it is possible to use a electrolytic capacitor with a smaller capacity for filtering on the premise of achieving the same effect, so that production costs are greatly reduced; meanwhile, the smaller volume of the electrolytic capacitor also facilitates the compactness and integration of the product.

In some embodiments, the LED driver further comprises an over-voltage protection module 380 for keeping the voltage across the LED 420 below a threshold, so as to prevent the LED 420 from being damaged under extreme conditions. In the embodiment shown in FIG. 2, the over-voltage protection module 380 comprises a fourth diode D4, a fifth zener diode D5, and a fourth capacitor C4. A cathode of the fourth diode D4 is coupled to the first terminal of the second coil 331. An anode of the fourth diode D4 is coupled to an anode of the fifth zener diode D5. A cathode of the fifth zener diode D5 is coupled to the driving signal output terminal 332. The fourth capacitor C4 is coupled between the anode of the fourth diode D4 and the second terminal of the second coil 331.

Figure 3:
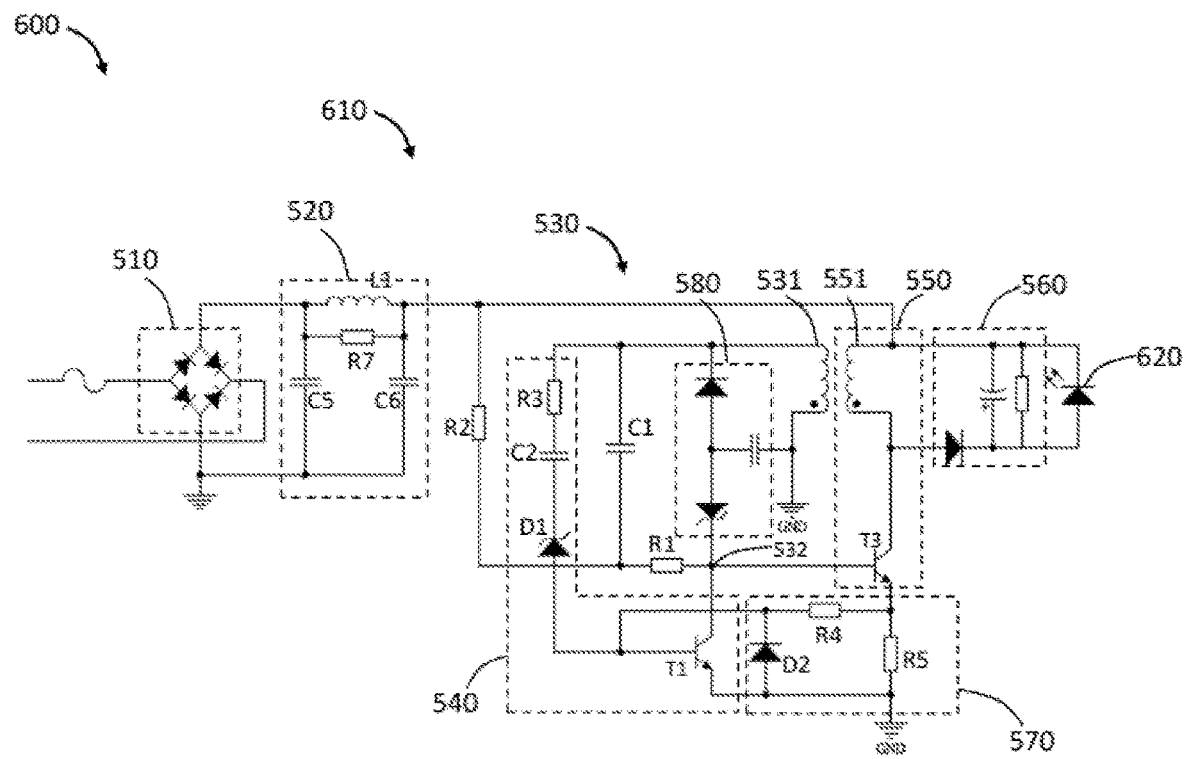
FIG. 3 is a schematic diagram of an LED system according to yet another particular embodiment of the invention.

FIG. 3 is a schematic diagram of an LED system 600 according to another particular embodiment of the invention. Referring to FIG. 3, the LED system 600 comprises an LED driver 610 and an LED 620. The LED driver 610 comprises a rectifier 510, a shielding module 520, a main circuit 550 of an RCC, a driving circuit 530 of the RCC, a first adjustment module 540, a second adjustment module 570, an over-voltage protection module 580, and a filter 560. The connection modes and functions of the rectifier 510, the shielding module 520, the main circuit 550 of the RCC, the driving circuit 530 of the RCC, the over-voltage protection module 580, and the filter 560 are similar to those of the corresponding components shown in FIG. 2, and will not be repeated here.

In the embodiment shown in FIG. 3, the first and second adjustment modules 540 and 570 share the same triode, and both absorb the driving current from the driving signal output terminal 532 through the triode.

Particularly, the first adjustment module 540 comprises a third resistor R3, a second capacitor C2, a first zener diode D1, and a first triode T1. The connection modes thereof are the same as those of the corresponding components in the first adjustment module 340 shown in FIG. 2, and will not be repeated here.

The second adjustment module 570 is coupled to the first triode T1 in the first adjustment module 540, and is configured to absorb the second part of the driving current from the driving circuit 530 via the first triode T1. Particularly, the second adjustment module 570 comprises a second diode D2, a fourth resistor R4, and a fifth resistor R5. First terminals of the fourth and fifth resistors R4 and R5 are both coupled to the emitter of the third triode T3, an anode of the second diode D2 is coupled to a second terminal of the fifth resistor R5, a cathode of the second diode D2 is coupled to a second terminal of the fourth resistor R4, the cathode of the second diode D2 is also coupled to a base of the first triode T1, and the anode of the second diode D2 is also coupled to an emitter of the first triode T1.

Figure 4:
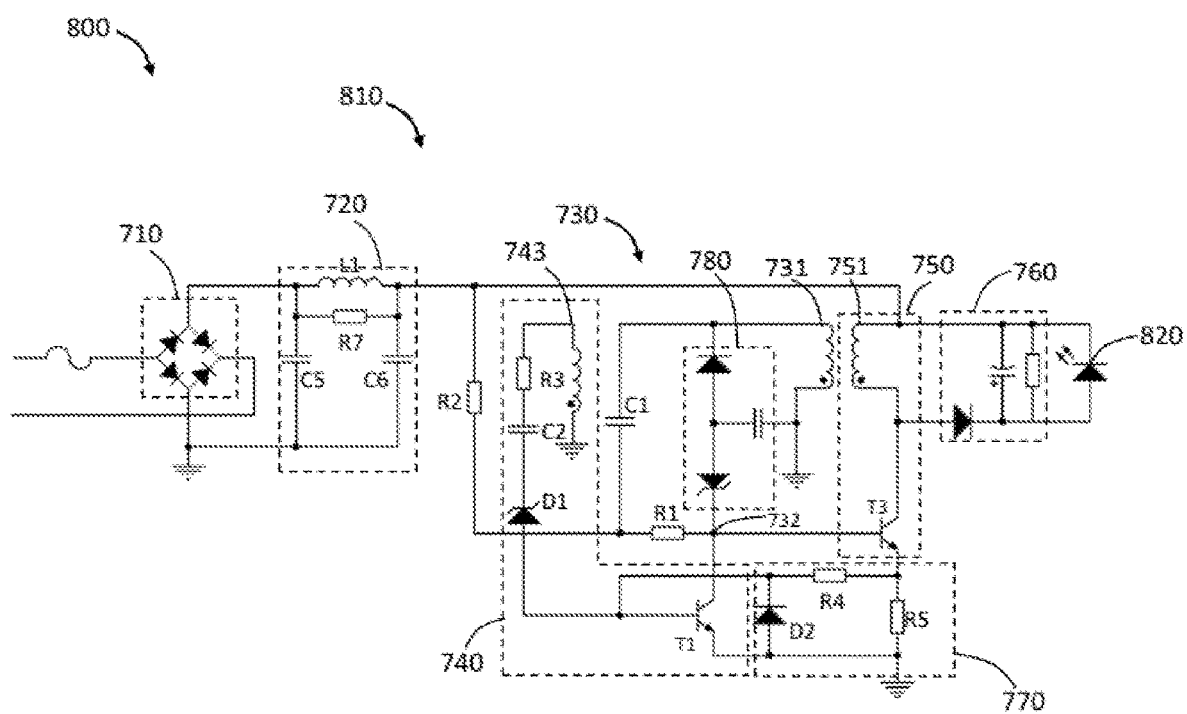
FIG. 4 is a schematic diagram of an LED system according to yet another particular embodiment of the invention.

FIG. 4 is a schematic diagram of an LED system 800 according to yet another particular embodiment of the invention. Referring to FIG. 4, the LED system 800 comprises an LED driver 810 and an LED 820. The LED driver 810 comprises a rectifier 710, a shielding module 720, a main circuit 750 of an RCC, a driving circuit 730 of the RCC, a first adjustment module 740, a second adjustment module 770, an over-voltage protection module 780, and a filter 760. The connection modes and functions of the rectifier 710, the shielding module 720, the main circuit 750, the driving circuit 730, the second adjustment module 770, the over-voltage protection module 780, and the filter 760 are similar to those of the corresponding components shown in FIG. 3, and will not be repeated here.

The first adjustment module 740 comprises a third coil 743, a third resistor R3, a second capacitor C2, a first zener diode D1, and a first triode T1. The third coil 743 is magnetically coupled to the first coil 751 to induce changes in the input voltage. The third resistor R3, the second capacitor C2 and the first zener diode D1 are coupled in series between the third coil 743 and the base of the first triode T1. The collector of the first triode T1 is coupled to the driving signal output terminal 732 of the driving circuit 730.

Although the invention has been described in detail in conjunction with specific particular embodiments, those skilled in the art will understand that many modifications and variations can be made to the invention. Therefore, it should be recognized that the intention of the claims is to cover all those modifications and variations within the true concept and scope of the invention.

What is claimed is:

1. A driver of a Light Emitting Diode (LED), comprising:
   a main circuit of a Ringing Choke Converter (RCC), comprising:
   an energy input terminal, configured to receive an input voltage;
   an energy output terminal, coupled to the LED and configured to provide an output current to the LED; and
   a control terminal, configured to receive a driving signal;
   a driving circuit of the RCC, comprising a driving signal output terminal coupled to the control terminal, and being configured to provide the driving signal to the main circuit via the driving signal output terminal;
   a first adjustment module, coupled between the energy input terminal and the driving signal output terminal, and configured to adjust the driving signal according to the input voltage; and
   a second adjustment module, coupled between the energy output terminal and the driving signal output terminal, and configured to adjust the driving signal according to the output current,
   wherein the driving signal comprises a driving current, and the first adjustment module is configured to adjust the driving current by absorbing a first part of the driving current; and
   wherein the first adjustment module comprises a first triode, a collector of the first triode is coupled to the driving signal output terminal, and the first adjustment module is configured to absorb the first part of the driving current via the first triode.

2. The driver according to claim 1, wherein the first adjustment module further comprises a resistor and a capacitor coupled in series with each other, and the resistor and the capacitor are coupled to a base of the first triode.

3. The driver according to claim 2, wherein the first adjustment module further comprises a first zener diode coupled in series with the resistor and the capacitor.

4. The driver according to claim 2, wherein the main circuit comprises a first coil, the driving circuit comprises a second coil magnetically coupled to the first coil, and the resistor and the capacitor are coupled between the second coil and the base of the first triode.

5. The driver according to claim 2, wherein the main circuit comprises a first coil, the first adjustment module comprises a third coil magnetically coupled to the first coil, and the resistor and the capacitor are coupled between the third coil and the base of the first triode.

6. The driver according to claim 1, wherein the second adjustment module adjusts the driving current by absorbing a second part of the driving current.

7. The driver according to claim 6, wherein the second adjustment module comprises a second triode, a collector of the second triode is coupled to the driving signal output terminal, and the second adjustment module is configured to absorb the second part of the driving current via the second triode.

8. The driver according to claim 6, wherein the second adjustment module is coupled to the first triode and configured to absorb the second part of the driving current via the first triode.

9. The driver according to claim 1, further comprising a filter, coupled between the main circuit and the LED, and configured to reduce or eliminate ripples in the output current.

10. The driver according to claim 1, further comprising a rectifier, coupled to the energy input terminal of the main circuit, and configured to convert an AC voltage from a power source to the input voltage provided to the main circuit.

11. The driver according to claim 10, further comprising a shielding module, coupled between the rectifier and the main circuit, and configured to reduce or eliminate electromagnetic interference of the driver to an external component.

12. A Light Emitting Diode (LED) system, comprising:
    an LED;
    a main circuit of a Ringing Choke Converter (RCC), comprising:
    an energy input terminal, configured to receive an input voltage;
    an energy output terminal, coupled to the LED and configured to provide an output current to the LED; and
    a control terminal, configured to receive a driving signal;
    a driving circuit of the RCC, comprising a driving signal output terminal coupled to the control terminal, and being configured to provide the driving signal to the main circuit via the driving signal output terminal;
    a first adjustment module, coupled between the energy input terminal and the driving signal output terminal, and configured to adjust the driving signal according to the input voltage; and
    a second adjustment module, coupled between the energy output terminal and the driving signal output terminal, and configured to adjust the driving signal according to the output current, wherein the driving signal comprises a driving current, and the first adjustment module is configured to adjust the driving current by absorbing a first part of the driving current, and wherein the first adjustment module comprises a first triode, a collector of the first triode is coupled to the driving signal output terminal, and the first adjustment module is configured to absorb the first part of the driving current via the first triode.

13. The LED system of claim 12, wherein the first adjustment module further comprises a resistor and a capacitor coupled in series with each other, and the resistor and the capacitor are coupled to a base of the first triode.

14. The LED system of claim 13, wherein the first adjustment module further comprises a first zener diode coupled in series with the resistor and the capacitor.

15. The LED system of claim 13, wherein the main circuit comprises a first coil, the driving circuit comprises a second coil magnetically coupled to the first coil, and the resistor and the capacitor are coupled between the second coil and the base of the first triode.

16. The LED system of claim 13, wherein the main circuit comprises a first coil, the first adjustment module comprises a third coil magnetically coupled to the first coil, and the resistor and the capacitor are coupled between the third coil and the base of the first triode.

17. The LED system of claim 12, wherein the second adjustment module adjusts the driving current by absorbing a second part of the driving current.

18. The LED system of claim 17, wherein the second adjustment module comprises a second triode, a collector of the second triode is coupled to the driving signal output terminal, and the second adjustment module is configured to absorb the second part of the driving current via the second triode.

19. The LED system of claim 17, wherein the second adjustment module is coupled to the first triode and configured to absorb the second part of the driving current via the first triode.

20. The LED system of claim 12, further comprising at least one of:

a filter, coupled between the main circuit and the LED, and configured to reduce or eliminate ripples in the output current;

a rectifier, coupled to the energy input terminal of the main circuit, and configured to convert an AC voltage from a power source to the input voltage provided to the main circuit; and a shielding module, coupled between the rectifier and the main circuit, and configured to reduce or eliminate electromagnetic interference of the driver to an external component.

* * * * *